Figure 1:
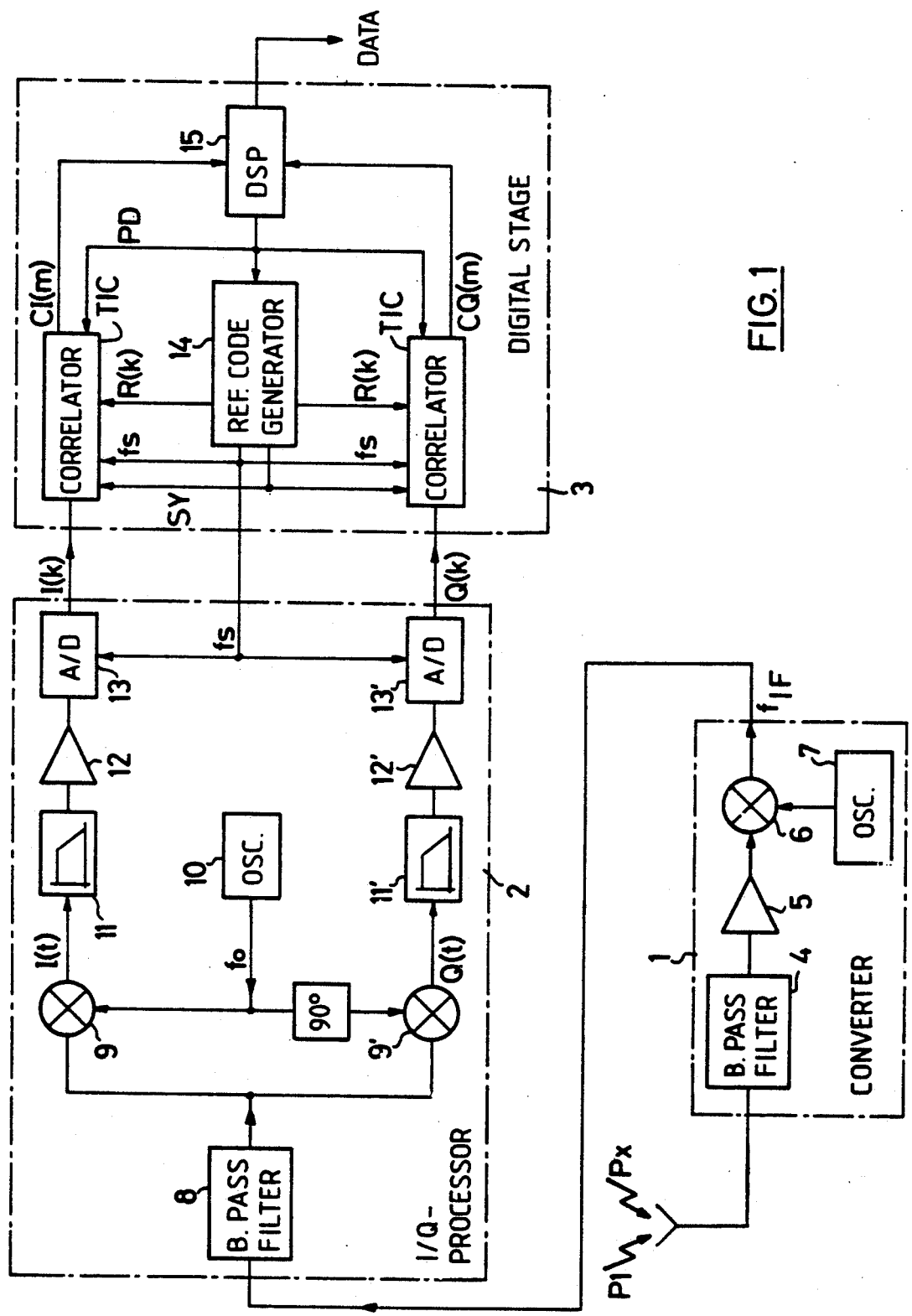

United States Patent [19]

Kaufmann

[11] Patent Number: 5,216,691
[45] Date of Patent: Jun. 1, 1993

[54] DIGITAL RECEIVER FOR SPREAD-SPECTRUM SIGNALS

[75] Inventor: Hans Kaufmann, Gossau, Switzerland

[73] Assignee: Ascom Zelcom AG, Hombrechtikon, Switzerland

[21] Appl. No.: 689,820

[22] PCT Filed: Oct. 5, 1990

[86] PCT No.: PCT/CH90/00237
§ 371 Date: Feb. 20, 1992
§ 102(e) Date: Feb. 20, 1992

[87] PCT Pub. No.: WO91/06164
PCT Pub. Date: May 2, 1991

[30] Foreign Application Priority Data
Oct. 19, 1989 [CH] Switzerland .............. 3811/89

[51] Int. Cl.⁵ .................................... H04L 27/30
[52] U.S. Cl. .................................... 375/1; 380/34
[58] Field of Search ..................... 375/1; 380/34

[56] References Cited

U.S. PATENT DOCUMENTS

| | | | |
|---|---|---|---|
| 4,164,628 | 8/1979 | Ward et al. | 375/1 |
| 4,361,891 | 11/1982 | Lobenstein et al. | 375/1 |
| 4,530,103 | 7/1985 | Mosley, Jr. et al. | 375/1 |
| 4,611,333 | 9/1986 | McCallister et al. | 375/1 |
| 4,755,969 | 7/1988 | Pappas | 375/1 |
| 4,813,006 | 3/1989 | Burns et al. | |
| 4,894,841 | 1/1990 | Martinino et al. | 375/1 |
| 4,894,842 | 1/1990 | Broekhoven et al. | 375/1 |
| 4,905,221 | 2/1990 | Ichiyoshi | 375/1 |
| 4,984,247 | 1/1991 | Kaufmann et al. | 375/1 |
| 4,998,261 | 3/1991 | van Driest et al. | 375/1 |
| 5,040,024 | 2/1992 | Vander Mey et al. | 375/1 |
| 5,134,407 | 7/1992 | Lorenz et al. | 375/1 |

FOREIGN PATENT DOCUMENTS 0361299 4/1990 European Pat. Off. .

OTHER PUBLICATIONS

B. E. Burke, D. L. Smythe; "A CCD Time-Integrating Correlator"; IEEE J. of Solid State Circuits, SC-18, Dec. 1983.
F. B. Rotz; "Time-Integrating Optical Correlator"; Proc. SPIE, vol. 202, 1979.
W. R. Braun; "Performance Analysis for the Expanding Search PN Acquisition Algorithm"; IEEE Trans. Comm.; COM-30, 1982.
N. A. Saethermoen, B. Skeie and S. Prytz; "Digital SOS-MOS Correlator: Basic System Component in Experimental Army Spread Spectrum Radio"; 2nd Int. Conf. on the Impact of High Speed and VLSI Technology on Comm. Systems, London, 1983.

Primary Examiner—Salvatore Cangialosi
Attorney, Agent, or Firm—Oliff & Berridge

[57] ABSTRACT

The receiver contains a correlator (TIC) for the correlation of the received signal with a reference code (R(k)) and a digital signal processor for evaluating the results of the correlation. The correlator is constructed as digital, time-integrating, multistage correlator (TIC), the individual stages (K1 to KN) of which are connected on the one hand to a digital delay line (17) fed with the reference code (R(k)) and to which on the other hand a digital signal (S(k)) recovered from the received signal is applied, to length (D) of the delay line (17) being adapted to the maximum expected impulse response to the transmission channel.

17 Claims, 3 Drawing Sheets

DIGITAL RECEIVER FOR SPREAD-SPECTRUM SIGNALS

The present invention relates to a digital receiver for spread-system signals generated by multiplication of an information-carrying signal by an auxiliary function, having a correlator for the correlation of the received signal with a reference code, and having a digital signal processor for evaluating the results of the correlation.

European Patent Application No. 89,117,388.2 describes a digital radio transmission system which uses the spread-spectrum technique in which digital signal processing is used bu the correlators of the receives are constructed discretely with analog components and are thus relatively costly in terms of space and power requirements. In addition, the analog components have the known drifting and aging problems and they also restrict the application possibilities of the digital signal processing.

By means of the invention, the implementation of digital correlators with sufficiently high time-bandwidth products will now be made possible, so that receives can be built which are compact and economical in terms of power consumption and which do not have any drifting and aging problems.

This object is achieved according to the invention by means of a digital, time-integrating, multistage correlator, the individual stages of which are connected on the one hand to a digital delay line fed with the reference code and to which on the other hand a digital signal recovered from the received signal is applied, the length of the delay line being adapted to the maximum expected length of the impulse response of the transmission channel.

The correlator according to the invention can be integrated monolithically and is therefore economical in terms of space and power and is easy to install. The receives equipped with correlators of this kind do not have the drifting and aging problems of the known analog solutions and are extremely flexible. The receives are particularly suitable for radio transmission systems with multipath propagation, but they also permit multiple use of the transmission channel by means of multiple access (code division multiple access=CDMA). Such receivers are used advantageously for radio systems with microcell arrangement in locally limited areas such as factory premises, houses or multi-story buildings.

Figure 2:
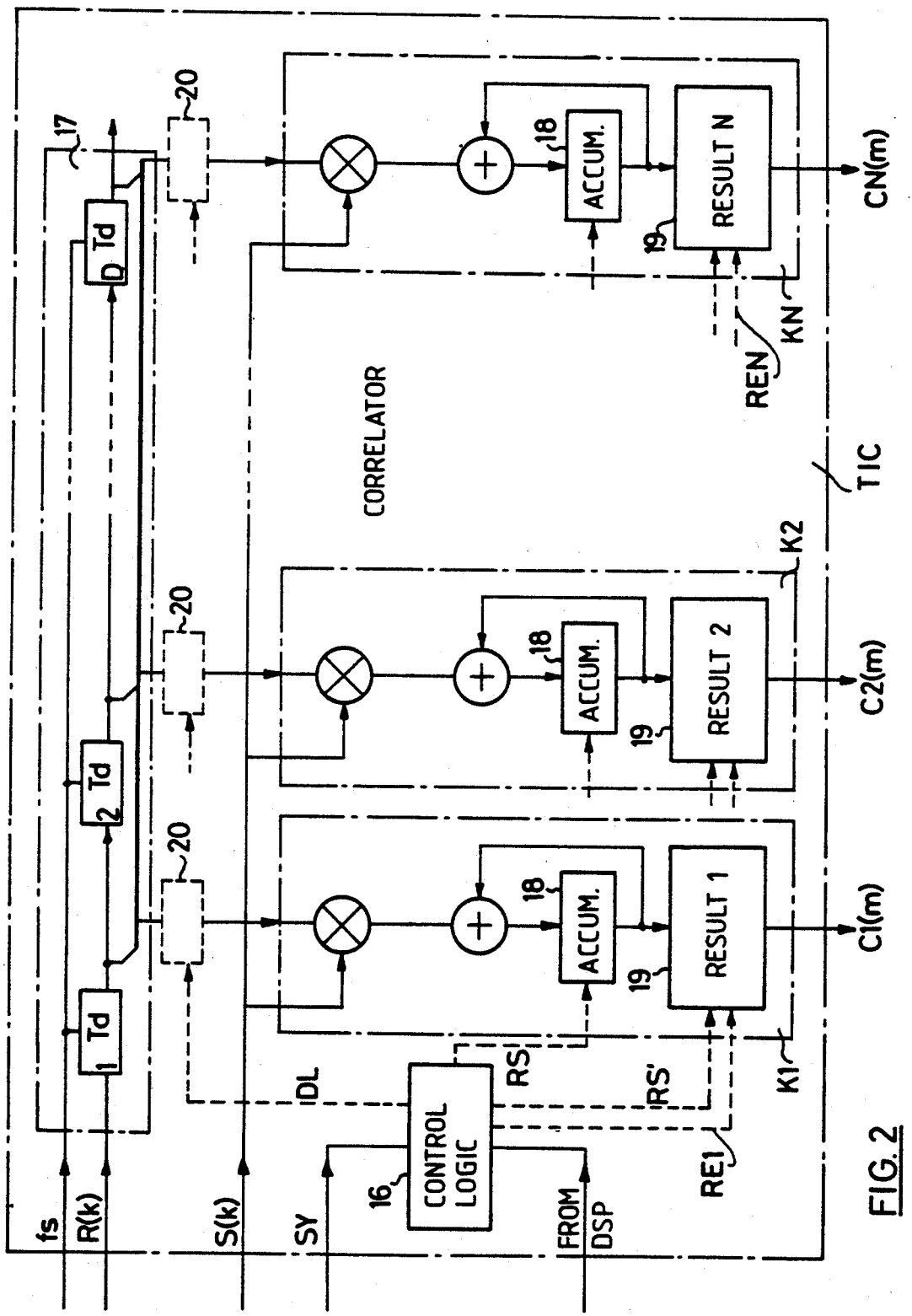

The invention is explained in greater detail below with reference to an exemplary embodiment and the drawings, in which:

FIG. 1 shows a block circuit diagram of a digital multipath receiver for spread-spectrum signals, FIG. 2 shows a block circuit diagram of the correlator of the receiver of FIG. 1; and FIGS. 3a, 3b, 4a, 4b are diagrams for the purpose of functional explanation.

The multipath receiver according to the invention is a digital receiver for spread-spectrum signals according to the so-called direct sequence method and it is particularly suitable for radio transmission systems on channels with multipath propagation. A system of this kind is described in European Patent Application No. 89,117,388.2 by the Ascom Zelcom AG, reference being hereby explicitly made to the disclosure of said patent application. The digital receiver described below constitutes an improvement of the correlation receiver described in this patent application, the improvement concerning primarily the employed correlators of the receiver, in that now digital correlators are proposed.

FIG. 1 shows a block diagram of a digital multipath receiver which includes, according to the illustration, three blocks: a converter 1, a so-called I/Q processor 2 and of a digital stage 3. In the converter 1, the received broad-band signal which arrives at the aerial of the receiver via paths Pl to Px is filtered in a band-pass filter 4 in order to suppress signals outside the employed frequency band. The output signal of the band-pass filter 4 is amplified in an amplifier 5 and mixed in a mixer 6, at whose other input a local oscillator 7 is connected, to an intermediate frequency $f_{IF}$. This intermediate frequency signal now passes into the I/Q processor 2 where it is filtered in a further band-pass filter 8 and then mixed into the base band by multiplication mixer 9, 9') by a cosine or sine signal of the frequency fo from a local oscillator 10. As a result, two resulting signals I(t) and Q(t) arise which are freed from high-frequency signal portions by low-pass filters 11, 11' and amplified in amplifiers 12, 12'. Subsequently, the two signals are quantized in analog-to-digital converters 13, 13' with a sampling rate of fs=c/Tc and represented as digital values I(k) and Q(k) by b bits, b being for example equal to 8.

In the formula for the sampling rate fs, c designates the number of sampling values per code element (=chip) and Tc the duration of a chip. This duration corresponds to the smallest square-wave pulse length of the auxiliary function used for band spreading, the characteristic of which of course is known to the receiver in a spread-spectrum system and which is formed in the receiver by the reference code.

The third block of the receiver, the digital stage 3 which processes exclusively digital signals, essentially includes correlators TIC, a reference code generator 14 and a digital signal processor 15. The sequences I(k) and Q(k) are each fed into a correlator TIC and correlated there with the reference code R(k). The correlation results CI(m) and CQ(m) are read by the digital signal processor 15 and processed further. The latter derives control signals PD from them for controlling the reference code generator 14 and the correlators TIC, calculates the deviation between he carrier frequency $f_{IF}$ and the local oscillator frequency fo and carries out the coherent demodulation of the transferred information bits. The reference code generator 14 supplies the correlators TIC with the reference code R(k), the sampling rate fs and a synchronization signal SY, and supplies the analog-to-digital converters 13, 13' with the sampling rate fs.

The requirements on digital correlators are determined by the parameters of the in-house radio transmission system. A clock rate (chip rate) for the pseudo-random auxiliary function in the region of 10 to 30 MHz can be derived from the coherence bandwidth of the propagation channel. In order to permit a sufficiently large number of users in a cellular system with multiple access (CDMA) spreading factors of at least 255 to approximately 4000 are required. Since the synchronization of the local reference code to the received code should also occur digitally in a digital correlation receiver and in this process each chip must be sampled at least twice, sampling and processing rates for the correlator of 20 to 60 MHz are obtained.

Since a plurality of signals are superimposed on one another at the reception site due to multipath propagation and multiple occupation of the channel by means of CDMA, at the receiver input the signal no longer has a constant signal envelope and must therefore be amplitude-quantized in front of the correlator with resolution of several bits. If this does not occur, intolerable losses then arise. The reference code can, however, be present as a binary signal.

A digital correlator which fulfils these requirements can be realized as a programmable transverse filter or as a time-integrating correlator. An implementation as programmable transverse filter is known from the publication "Digital SOS-MOS Correlator: Basic System Component in Experimental Army Spread Spectrum Radio" by N. A. Saethermoen, B. Skeie and S. Prytz in 2nd Int. Conf. on the Impact of High Speed and VLSI Technology on Comm. Systems, London 1983. However, this implementation is extremely costly since with two sampling values per code chip per signal bit, at least 2:L memory cells for each of the reference codes and the signal are required and 2:L multipliers are required (L=code length). The data rate of the correlation result is the same as the sampling rate of the input signal and therefore very high. This permits a rapid synchronization but is unfavourable for the further digital signal processing.

In contrast to the programmable transversal filter, the output data rate in a time-integrating correlator is reduced in relation to the sampling rate at the input by the number of summed correlation products. With integration over a complete code period, the correlation results only occur with the information bit rate, which signifies a reduction in the sampling rate of the input signal by the product c:L (c=number of sampling values per code chip). This reduced data rate can now be easily processed further in a digital signal processor.

From the literature, implementations of time-integrating correlators in CCD technology (CCD: charge-coupled device) are known (B. E. Burke, D. L. Smythe: "A CCD Time-Integrating Correlator", IEEE J. of Solid State Circuits, SC-18, Dec. 1983) and as acousto-optical components (F. B. Rotz: "Time-Integrating Optical Correlator", Proc SPIE, Vol. 202, 1979). Since, one the one hand, the CCD solution is limited to clock rates of a maximum of 20 MHz and has a dynamic range restricted by offset voltages and clock crosstalk, and, on the other hand, the acousto-optical solution cannot be built up monolithically and is moreover complicated and expensive, these known implementations are not suitable for the digital multipath receiver of FIG. 1.

Although the digital correlator TIC is a time-integrating correlator, it is neither a charge-coupled nor an acousto-optical component, but rather its architecture is especially adapted to the requirements of a multipath receiver according to the scanner principle. The solution found for this, which is described below, is monolithically integrateable and therefore simple to use, and it is space-saving and economical in terms of power. The programmable functions of the time-integrating correlator TIC and the evaluation of the correlation results in the digital signal processor 15 permit the construction of a very flexible spread-spectrum receiver.

FIG. 2 shows a block diagram of the time-integrating correlators TIC employed in the receiver of FIG. 1. The number sequences, designated in FIG. 1 by I(k) and Q(k), of the I/Q processor 2 are designated here in general as representative of both number sequences with S(k). According to the illustration, the correlator includes N correlator stages Kn, a control logic 16 and a digital delay line 17, to which the correlator stages are connected in parallel.

The architecture of the time-integrating correlator is adapted to the expected impulse response of the propagation channel. This impulse response is, as measurements have shown, significantly shorter than the data bit length, so that significant correlation values only arise during a short part of the code length. In the synchronized state, it is therefore sufficient to correlate only a small section of the complete code with the received signal. For this purpose, the binary reference code R(k) supplied by the reference code generator 14 (FIG. 1) is fed into the digital delay line 17, which has a certain length D, in the present case D=32, and which is operated with the clock fs, for example fs=2/Tc. The reference code is delayed by the time Td between each of the terminals of two successive correlator stages Kn, in which case preferably Td=Tc/2. The n-th correlator stage therefore receives the reference code delayed by n:Td as a reference signal. The digitized output signal S(k) of the I/Q processor 2 (FIG. 1) having, for example, 8-bit resolution is connected in parallel to all correlator stages Kn.

Each correlator stage Kn contains, as illustrated, an accumulator 18 and a result memory 19 which are both controlled by the control logic 16, and calculates the product of S(k) and R(k-n). These products are summed and stored in the respective accumulator 18 over a complete code length k (k=1 ... c times L). At the end of the summation, the correlation value Cn(m) is transmitted into the result memory 19 by a control signal RS' of the control logic 16, and then the accumulator 18 is set to zero again with RS. Each result memory 19 supplies its correlation value Cn(m) after a corresponding control signal REn (m=1 to N) of the control logic 16 to the digital signal processor 15 (FIG. 1) which further processes the results of the preceding correlation during the next summation period. On the basis of the signal REn (Read Enable) and under the control of the digital signal processor in each case a single correlation is read out via a bus.

The design of the time-integrating correlator TIC can be further simplified by means of a selection circuit 20 which connects a delayed reference sequence for each correlation stage Kn with a delay which can be programmed by the digital signal processor 15. This simplification is based on the following consideration: the length D of the delay line 17 must be adapted to the maximum expected length of the channel impulse response which is approximately 1 microsecond in the present case. However, in practice this impulse response always consists of a plurality of discrete signal portions with specific delays tp, so that only these discrete signal portions, therefore, need to be correlated. For this purpose, correlator stages are placed only at those points tp where signal portions are effectively present. As a result, the number N of correlator stages can be kept substantially smaller than the length D of the delay line 17. In the present exemplary embodiment where D=32, a number of N=8 correlator stages is still sufficient. A precondition for this mode of operation is a free programmability of the delay of each correlator stage. The programming occurs through the digital signal processor 15 which drives a line DL via control logic 16, that programs the selection circuit 20 which, itself, connects the reference sequence with the programmed delay to the respective correlator stage.

In addition to the already mentioned advantages of the digital multipath receiver, a further essential advantage includes the fact that the essential functions of a spread-spectrum receiver can be completely carried out by corresponding operations in the digital signal processor. The receiver can be characterized by the following states:
-coarse synchronization (acquisition)
-operation
-re-synchronization on loss of the code synchronism.

As already mentioned, the duration of the impulse response of the transmission channel is only a fraction of the data bit length and thus of the code length L. For the acquisition, the N correlator stages of the time-integrating correlator are now programmed in such a way that the delay positions between succeeding stages differ by a constant delay e:Tc, e=1 being selected for example. By shifting the receive-side reference code by N:e:Tc after every accumulation period, the complete code length is correlated sequentially with the received signal. The acquisition time Tacq is then Tacq=L:Tc:(L/N:e)) in comparison to L:Tc L/e for a correlator of the type of a programmable transverse filter. The respective reception energy E(m) for each delay can be calculated form the correlation values CI(m), CQ(m) obtained in this way:

$$E(m) = CI(m)^2 + CQ(m)^2$$

After searching the complete code length, the position is determined where the maximum reception energy has occurred. In order to confirm whether the energy maximum has really been found, it is examined whether the energy around this maximum is greater by a specific amount than the noise energy averaged over the complete code length. If this is the case, the reference code generator 14 (FIG. 1) is programmed in such a way that the energy maximum lies in the center of the reception window covered by the correlator. Thus, the acquisition is terminated and the receiver goes into the normal operating state; otherwise the acquisition is repeated.

The normal operating state comprises the following functions: monitoring the channel impulse response (scanning); tracking the phase of the local reference code generator; estimating the carrier phase and coherent or differential demodulation of the signals of the individual reception paths; deriving the weighting functions for the individual reception paths from the channel impulse response; combining the individual paths and detecting the transferred data bit. If an error protection coding has occurred in the transmitter, the receiver can additionally supply a quality criterion for the following error decoder for the so-called soft decision.

Figure 3A:
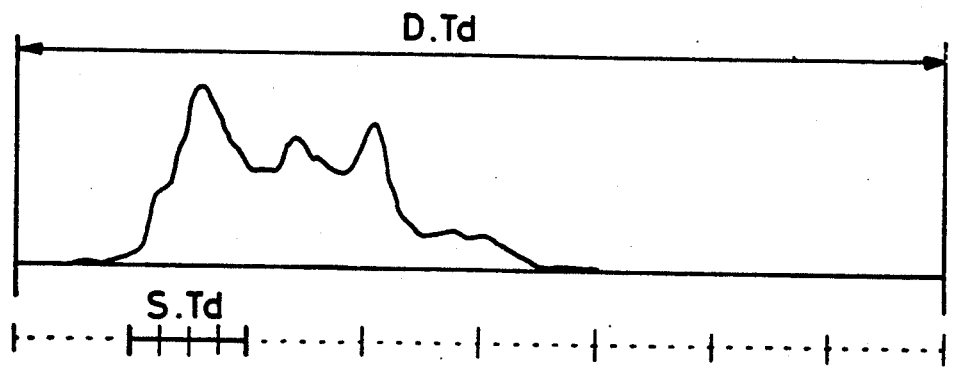

The advantages of a multipath receiver then have the maximum effect if a good estimation of the channel impulse response can be carrier out. This occurs in the present digital receiver by means of the scanning algorithm, for which S of the total N correlator stages of the time-integrating correlator TIC can be used. The other correlator stages (number=N-S) are required in parallel to the latter for the data demodulation. With the scanner-correlation stages mutually shifted by the Td, L:Tc correlation values are calculated during a code period. Then, the correlator stages are shifted by S:Td, and the calculation of the correlation values is repeated for this position. After ts=D/S code periods, the entire window is searched and the scanning process begins again. This scanning function is illustrated in FIG. 3a.

Figure 3B:
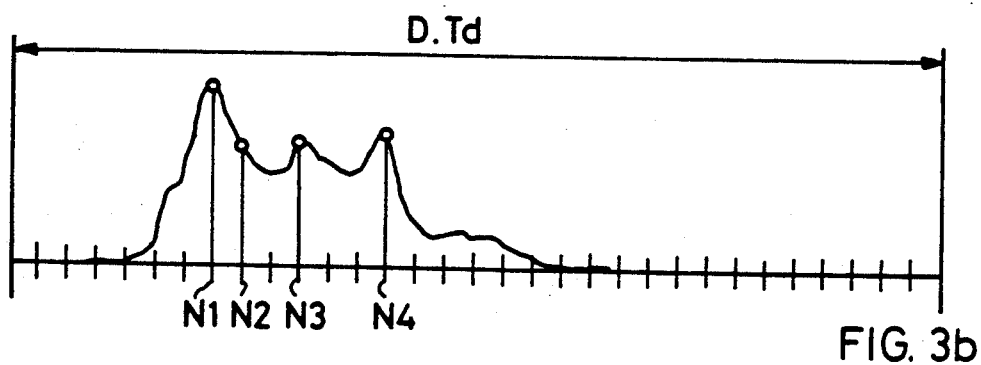
Figure 4A:
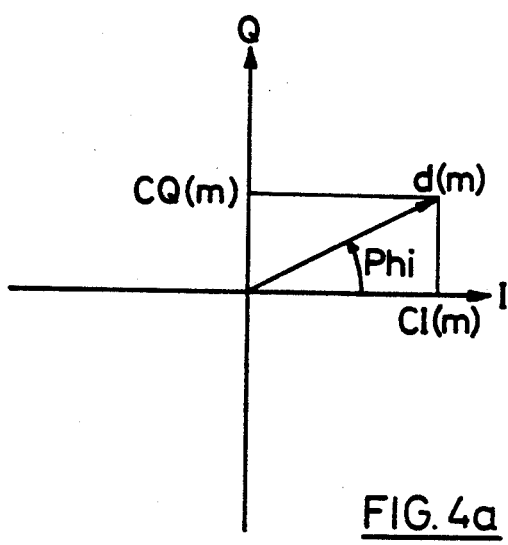

As can be seen in FIG. 3b, the correlator stages required for the demodulation are programmed at the points where the greatest reception power is to be expected. These correlation values CI(m) and CQ(m) can be interpreted according to FIG. 4a as coordinates of a data vector d(m)=(CI(m), CQ(m)) in the complex plane. FIG. 4a therefore constitutes the absolute value of the channel impulse response measured during the scanning function.

In order for the measurements of the channel impulse response to be significant when scanning, the scan time ts must be smaller than the minimum change time of the transmission channel. The more correlator stages which are used for the scanning, the quicker the changing channels which can be monitored. Hence, correspondingly fewer correlator stages are then available for the data demodulation. For typical in-house channels in the described system for example S=4 scanner channels are required. Since the time-integrating correlator TIC can be programmed by the digital signal processor 15 (FIG. 1), the partition into scanner and demodulator channels can also occur adaptively.

With the aid of the correlation values of the scanner channels, it is monitored whether the correlation window of the time-integrating correlator TIC is correctly positioned in relation to the received signal. Because the channel impulse response is usually shorter than the window width, a noise power can be determined from the values outside the impulse response. If the ratio of the power of all the reception paths to this noise power falls below a predetermined threshold, a resynchronization is initiated.

The fine synchronization (tracking) of the reference code can occur in such a way that the weighted average of the D correlation values, that is to say their median point, is positioned in the center of the window of the time-integrating correlator. A different method consists in positioning the strongest reception path in each case at a specific point, for example at D:Td/3.

As has already been mentioned, the correlation values CI(m) and CQ(m) of the scanner channels can be interpreted as coordinates of a data vector d(m)=(CI(m), CQ(m)) in the complex plane (FIG. 4a). The angle Phi between the data vector and the real axis then corresponds to the phase shift between the carrier of the received signal and the local oscillator. If the frequencies of the received signal and of the local oscillator coincide ($f_{IF}$=fo), the angle Phi will remain constant on average and assume an average value and only fluctuate around this average value due to the noise in the received signal.

For an optimum detection, by averaging over a plurality of reception vectors, the unit vector e=(x1, y1) is calculated from the angle Phi as shown in FIG. 4a for which the following applies:

$$y1/x1 = \tan(phi)$$

$$x1^2 + y1^2 = 1$$

Each received data vector d(m) is multiplied by the complex conjugate of vector e:

$$B(m) = Re(e:d(m))$$

From the real part of the product, the transmitted data bit is determined from the sign of B(m); the magnitude of the product is a measure for the reliability of the decision and can be supplied as quality information to a following error decoder.

Figure 4B:
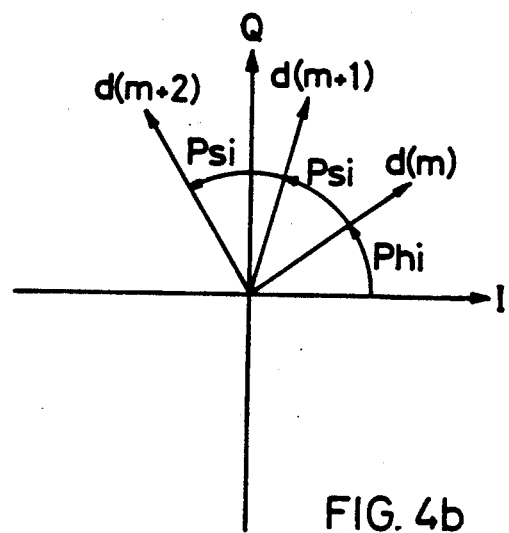

If the frequencies of received signal and local oscillator are different, successive vectors d(m) and d(m+1) are rotated towards one another (FIG. 4b). This rotation Psi is proportional to the frequency difference df and to the bit length Tb:

$$Psi = 2 \cdot Pi \cdot df \cdot Tb$$

In this case, in addition to the initial phase Phi, the frequency offset must also be estimated by means of the phase rotation Psi. From this, a reference vector r can be calculated which now no longer possesses a constant phase Phi, but rather rotates with the angular speed 2·Pi·df:

$$r(m) = (x2, y2)$$

$$y2/x2 = \tan(Phi + 2 \cdot Pi \cdot df \cdot m \cdot Tb)$$

The demodulation occurs in the same way as before:

$$B(m) = Re(r(m) \cdot d(m))$$

The estimation of the frequency difference df can occur, for example, by means of a Fast Fourier transform (FFT) by means of $2^M$ successive data vectors d(m).

($M = 1 \ldots 2^M$, to example $m = 1 \ldots 32$).

In a multipath receiver, each reception path n usually has a different phase shift Phi in relation to the local oscillator because of the different lengths of the propagation paths. The frequency difference df is, however, almost identical in in-house channels for all paths, since Doppler effect can be neglected. Therefore, the estimation of the frequency difference for all paths can occur jointly, whilst the phase for each path must be calculated individually. A simple solution is offered here by the differential demodulation of two successive data vectors d(m-1) and d(m). Here, the first vector d(m-1) is rotated by the amount Psi=2·Pi·df·Tb and then used as reference for the demodulation of the next data vector d(m):

$$r(m) = d(m-1) \cdot e^{j \cdot Psi}$$

The demodulated bit value is:

$$B(m) = Re(r(m)^* \cdot d(m))$$

The demodulated bit values B(m) of n channels are present in the multipath receiver. Said values have to be combined in an appropriate manner in order to enable a decision relating to the received bit to be made. For this purpose, for each reception channel the expected value of the signal amplitude $Gn = [(d_n(m) \cdot d_n(m)^*)^{\frac{1}{2}}]$ is calculated as weighting. The bit values B(m) are multiplied by the square of Gn and the products are summed over all values of n to form S(m). The sign of S(m) yields the value of the detected bit and the magnitude of S(m) is a measure of the strength of the received signal and therefore also of the reliability of this decision.

If the code synchronism is lost in operation, a resynchronization is performed. In contrast to the acquisition, however, the complete code length is not searched, but rather one of the search algorithms known from the literature is used, for example that according to the publication "Performance Analysis for the Expanding Search PN Acquisition Algorithm" by W. R. Braun, IEEE Trans. Comm., COM-30, 1982.

Thus, all the essential functions of the multipath receiver, in particular the evaluation of the results of the correlation have been carried out in the digital signal processor, which, in conjunction with the progammability of the functions of the time-integrating correlator, gives the described multipath receiver a considerable flexibility. In addition, the use of the time-integrating correlator with the described architecture permits a monolithically integrateable solution which is easy to use, space-saving and economical in terms of power.

What is claimed is:

1. A digital receiver for receiving, as a received signal, direct-sequence spread-spectrum signals propagated over a transmission channel and generated by multiplication of an information-carrying signal by an auxiliary function, the digital receiver comprising:

a digital, time-integrating multi-stage correlator for producing correlation output signals corresponding to correlations of the received signal with a reference code;

a digital signal processor for processing the correlation output signals;

means for recovering a digital signal from the received signal, the digital signal being supplied as a first input to each stage of the correlator; and a digital delay line having a length corresponding to a maximum expected length of an impulse response of the transmission channel carrying the direct-sequence spread-spectrum signals, an input which is fed with the reference code, and plural outputs corresponding to delayed reference codes which are successively time delayed with respect to each other and which are respectively connected to corresponding ones of the correlator stages as second inputs.

2. The digital receiver of claim 1, wherein the reference code comprises an encoded sequence of code elements, the number of code elements defining a code length, and each correlator stage includes:

an accumulator for storage of value;

multiplier means for producing a product of the digital signal and the delay line output which are inputted to the correlator stage; and summing means for forming a sum of the multiplier means product and a currently stored value from the accumulator, the summing means sum being subsequently stored in the accumulator as the stored value;

the multiplying means, summing means and accumulator being successively operated to accumulate in the accumulator a correlation output signal at the end of a code length.

3. The digital receiver of claim 2, further comprising selector means responsive to control signals from the digital signal processor for selecting a variable number S of the total number N of correlator stages for estimating the channel impulse response during a scanning mode of operation, the delayed reference codes inputted to the respective selected correlator stages being successively shifted with respect to each other by a predetermined constant time delay.

4. The digital receiver of claim 3, wherein the digital signal processor produces control signals for controlling the selector means during the scanning mode of operation such that:

an initial set of correlation output signals is produced, during a code period corresponding to the duration of a code element multiplied by the code length, by the selected correlator stages respectively using a first set of delayed reference codes; and successive sets of correlation output signals are produced during successive code periods by the selected correlator stages respectively using successive sets of delayed reference codes which are shifted from the preceding set of delayed reference codes by an amount equal to the product of the number of selected correlator stages and the predetermined constant time delay, the successive sets of correlation output signals being produced until the entire length of the reference code has been correlated sequentially with the digital signal.

5. The digital receiver of claim 4, wherein the digital signal processor evaluates the correlation output signals produced by the selected correlator stages during the scanning mode of operation to identify a first delay line position producing a corresponding first highest absolute value of the channel input response, and controls the selector means so that a first one of the correlator stages used during a demodulation mode of operation receives a delayed reference code from the first delay line position identified during the scanning mode of operation.

6. The digital receiver of claim 5, wherein:

the number of correlator stages used for demodulation is equal to N-S, and the digital signal processor controls the selector means so that the partition of the correlator stages between those used for scanning and those used for demodulation is performed dynamically in response to changing characteristics of the transmission channel.

7. The digital receiver of claim 2, wherein each correlator stage further includes a result memory which selectively stores the correlation value signal present in the associated accumulator of the correlation stage, and selectively outputs the correlation value signal stored therein to the digital signal processor, in response to control signals from the digital signal processor.

8. The digital receiver of claim 1, wherein the digital delay line comprises a plurality of stages which each produce a delay line output, and the number of delay line stages corresponds to the length of the digital delay line, and the number N of correlator stages corresponds to the number of delay line stages.

9. The digital receiver of claim 1, wherein the digital delay line comprises a plurality of stages which each produce a delay line output, and the number of delay line stages corresponds to the length of the digital delay line, and the number N of correlator stages is less than the number of delay line stages; and the relative time delay of each digital delay line output which is applied to a correlator stage is variable so that the digital signal is processed only where discrete signal portions of the impulse response occur.

10. The digital receiver of claim 9, further including a selection circuit responsive to the digital signal processor connected between the digital delay line and each of the correlator stages for varying the relative time delay of the digital delay line output provided to each correlator stage.

11. The digital receiver of claim 7, wherein the digital signal is recovered from the received signal at a sampling rate, and the digital delay line operates responsive to a clock to shift the reference code through the digital delay line at a rate corresponding to the sampling rate.

12. The digital receiver of claim 11, further including:

a filter for filtering the received signal to produce a filtered received signal;

a converter for mixing the filtered received signal to produce an intermediate frequency signal; and an I/Q processor comprising a local oscillator for mixing the intermediate frequency signal with cosine and sine base band signals produced by the local oscillator to produce an in-phase base band signal and a quadrature base band signal.

13. The digital receiver of claim 12, wherein the I/Q processor includes:

a first analog-to-digital convertor to convert the in-phase base-band signal to an in-phase digital signal; and a second analog-to-digital converter to convert the quadrature base-band signal to a quadrature digital signal.

14. The digital receiver of claim 13, further comprising a control circuit responsive to control signals from the digital signal processor for controlling the correlator during a coarse synchronization mode of operation such that successive sets of correlation output signals are sequentially produced, the delay line outputs used to produce a set of correlation output signal successively differing from each other by a constant delay, and each delay line output being successively shifted after each set of correlation output signals is produced by an amount corresponding to the product of the constant delay and the number of correlator stages producing the sets of correlation output signals.

15. The digital receiver of claim 14, comprising:

first and second digital, time-integrating multistage correlators, the first correlator being connected to the in-phase digital signal for producing in-phase correlation output signals and the second correlator being connected to the quadrature digital signal for producing quadrature correlation output signals associated with the in-phase correlation output signals;

a reference code generator for controllably generating the reference code;

means included in the digital signal processor for deriving respective reception energy values from each set of in-phase and associated quadrature correlation output signals to determine a maximum reception energy value; and means for controlling the reference code generator so that the reference code which is produced defines a reception window for the first and second correlators which is centered around the determined energy maximum.

16. The digital receiver of claim 15, wherein the digital signal processor:

derives a unit vector from a plurality of successive reception vectors respectively formed from the successive sets of in-phase and associated quadrature phase correlation output signals, combines each reception vector with the complex conjugate of the unit vector; and determines a corresponding transmitted data bit of the received signal in accordance with each result of combining a reception vector with the complex conjugate of the unit vector.

17. The digital receiver of claim 16, wherein the digital signal processor:

compensates the reception vectors, prior to deriving the unit vector, for phase rotation caused by frequency deviations between a carrier frequency of the received signal and the frequency of the local oscillator base band signals; and derives the unit vector by averaging the successive reception vectors.

* * * * *